United States Patent [19]
Homan

[11] 4,269,741
[45] May 26, 1981

[54] OXYGEN-CURABLE MERCAPTOORGANOSILOXANE COMPOSITIONS POSSESSING RAPID SURFACE REACTION AND METHOD OF FORMING HIGHER MOLECULAR WEIGHT PRODUCTS THEREFROM

[75] Inventor: Gary R. Homan, Midland, Mich.

[73] Assignee: Dow Corning Corporation, Midland, Mich.

[21] Appl. No.: 99,255

[22] Filed: Dec. 3, 1979

[51] Int. Cl.³ ............................................. C08L 91/00
[52] U.S. Cl. ............................... 260/18 S; 260/37 SB;
  528/12; 528/15; 528/23; 528/30; 528/32
[58] Field of Search ..................... 528/30, 32, 15, 23, 528/12; 260/37 SB, 18 S

[56] References Cited

U.S. PATENT DOCUMENTS

| | | | |
|---|---|---|---|
| 3,445,419 | 5/1969 | Vanderlinde | 260/37 |
| 4,070,328 | 1/1978 | Homan et al. | 260/37 SB |
| 4,070,329 | 1/1978 | Homan et al. | 260/37 SB |
| 4,133,939 | 1/1979 | Bokerman et al. | 428/447 |

OTHER PUBLICATIONS

Nametkin et al., "Synthesis and Some Properties of Sulfur-Containing Iron Tricarbonyl Complexes," Journal of Organometallic Chemistry, Elsevier Sequoia S. A., Lausanne, The Netherlands, 149, pp. 355-370, (1978).

Primary Examiner—Melvyn I. Marquis
Attorney, Agent, or Firm—Richard E. Rakoczy

[57] ABSTRACT

Compositions which are stable in the absence of oxygen are formed by mixing the following substantially in the absence of oxygen (A) 100 parts by weight of a mercapto-functional organosiloxane containing an average of at least two mercapto-functional substituents per molecule;

(B) 0 to 200 parts by weight of at least one filler;

(C) a catalytic amount, preferably from 0.1 to 6 parts by weight, of an iron carbonyl catalyst selected from the group consisting of $Fe(CO)_5$, $Fe_2(CO)_9$, $Fe_3(CO)_{12}$, dicyclopentadienyldiiron tetracarbonyl, butadieneiron tricarbonyl and cyclohexadieneiron tricarbonyl; and (D) 0.1 to 6 parts by weight of an acid which meets a particular set of criteria.

The compositions polymerize or cure to form higher molecular weight products at room temperature upon exposure to oxygen. These compositions are especially useful as coatings because they possess a rapid rate of surface cure at room temperature. Elastomeric sealant compositions can be prepared which rapidly become tack-free at room temperature and are therefore less prone to surface contamination by foreign matter such as dust.

26 Claims, No Drawings

OXYGEN-CURABLE MERCAPTOORGANOSILOXANE COMPOSITIONS POSSESSING RAPID SURFACE REACTION AND METHOD OF FORMING HIGHER MOLECULAR WEIGHT PRODUCTS THEREFROM

BACKGROUND OF THE INVENTION

1. Field of the Invention

This invention relates to compositions including organosiloxane polymers containing sulfur and to a method of forming higher molecular weight products from such compositions. This invention also relates to organosiloxane gels, elastomers and resins containing sulfur.

2. Description of the Prior Art

Compositions containing mercaptoorganosiloxanes free of any vinyl functionality which are polymerized by means of the mercapto groups to resins and sealants are known in the art. For example, in U.S. Pat. No. 4,133,939, Bokerman and Gordon teach a method of coating a substrate with a silicone release coating involving the radiation cure of mercapto-functional polydiorganosiloxane fluids mixed with a sensitizer such as benzophenone. While a radiation curing mechanism is rapid and provides one-package systems which are stable in the absence of heat and light, it is useful only for relatively thin coatings and requires a high intensity radiation source such as ultraviolet light or electron beams.

Peroxide cure of mercaptoorganosiloxanes free of vinyl unsaturation is also known, as is demonstrated by Homan and Lee in U.S. Pat. No. 4,070,329. In that patent, the patentees teach mixtures of mercaptoorganopolysiloxanes, organic peroxides and, optionally, a filler to provide a composition which cures at room temperature or by heating to form elastomers which are useful as sealants and rubber articles. Likewise, Homan and Lee in U.S. Pat. No. 4,070,328 claim the use of mixtures of mercaptoorganopolysiloxanes, organic hydroperoxides, a nitrogen compound and, optionally, a filler to produce a composition which cures at room temperature to elastomers which are useful as sealants and rubber articles. However, the above compositions are not one-package systems, since the polymerization or cure begins immediately upon mixing the ingredients.

Vanderlinde, in U.S. Pat. No. 3,445,419, teaches the production of a type of mercapto-functional copolymer consisting of organosiloxanes with mercapto-functional organic compound segments which are prepared by grafting a mercapto-functional carboxylic acid ester such as pentaerythritol tetrakis(3-mercaptopropionate) onto a vinyl-terminated organosiloxane. When an alkaline catalyst such as an amine is added to the resulting graft-copolymer, there is obtained a composition which is stable in the absence of air, but cures to an elastomer at room temperature upon exposure to air. However, this patent neither suggests the use of iron carbonyl catalysts nor does it suggest that the acids hereinafter defined can be used to accelerate the surface polymerization or cure of iron carbonyl catalyzed compositions.

Nametkin, et al., in the Journal of Organometallic Chemistry, 149, pp. 355-370 (1978) report that when stoichiometric amounts of $Fe(CO)_5$, $Fe_2(CO)_9$, or $Fe_3(CO)_{12}$ are reacted with thiols of the general formula RSH, where R is an alkyl or aryl radical, in solution, a complex $\{RSFe(CO)_3\}_2$ and a small amount of the disulfide, RSSR, is produced at room temperature and that $Fe_3(CO)_{12}$ is the most effective catalyst. Thermal decomposition of the complex in n-dodecane solution at 160° C. in the presence of air results in decomposition of the complex to form the disulfide. However, this article does not teach that $Fe(CO)_5$, $Fe_2(CO)_9$ or $Fe_3(CO)_{12}$ will function as a catalyst in non-stoichiometric amounts for the room temperature polymerization or cure of the compositions hereinafter described nor does it suggest the use of the acids hereinafter defined.

DESCRIPTION OF THE INVENTION

Gary R. Homan and Chi-Long Lee are the applicants named in U.S. patent application Ser. No. 099,252, filed Dec. 3, 1979 pending entitled "Oxygen-Curable Mercaptoorganosiloxane Compositions Catalyzed by Metal Carbonyl Compounds And Method Of Forming Higher Molecular Weight Products Therefrom", which was assigned to the same assignee as the present invention. In that patent application, Homan and Lee teach that certain metal carbonyl catalysts can be added to mercapto-functional organosiloxanes to produce compositions which are one-package, storage-stable in the absence of oxygen and easily cured simply by exposing the composition to an oxygen atmosphere, such as air or pure oxygen gas, at room temperature. These compositions have an advantage over acetoxy-functional, moisture-cured, one-component systems, such as those found in U.S. Pat. Nos. 3,035,016 and 3,077,465, in that no corrosive by-products are evolved during cure. Compositions which utilize platinum-catalyzed addition of SiH to vinyl are preferably cured by heating when formulated into one-package systems. One-package platinum-catalyzed systems of this type cure very slowly at room temperature. Fast room temperature cures require the use of a two-package system while compositions of the present invention are one-package systems which cure much faster than one-package platinum-catalyzed systems.

Quite unexpectedly, it was discovered that when an acid which satisfies the criteria set out below was included in iron carbonyl catalyzed compositions taught by Homan and Lee, above, the composition exhibited a much faster rate of surface polymerization or cure than did the same compositions without an "acid accelerator compound". As a result, the compositions of the present invention are especially useful where thin films are coated on articles such as wire, paper or electronic circuit boards because the rapid surface cure enables the articles to be handled at a much earlier time than compositions which do not contain acid accelerators. Rapid surface cure is an advantage where high speed coating is desired. Room temperature cure to a depth of 0.15 millimeters (mm) in approximately two minutes are possible and even faster cures are possible by using a thinner film, raising the level of acid accelerator, iron carbonyl catalyst and/or raising the temperature. For example, compositions of the present invention could be useful as coatings for paper. Such coatings generally range from 0.01 to 0.08 mm in thickness and require rapid rates of cure. The surface cure rate of elastomeric sealant compositions can also be improved to reduce the amount of time available for the surface to be contaminated by dust or other foreign matter.

This invention relates to a composition of matter, stable in the absence of oxygen, consisting essentially of a product obtained by mixing the following substantially in the absence of oxygen (A) 100 parts by weight of at least one mercapto-functional organosiloxane, said mercapto-functional organosiloxane having an average of at least two mercapto-functional siloxane units per molecule selected from the group consisting of mercapto-functional siloxane units of the average unit formula

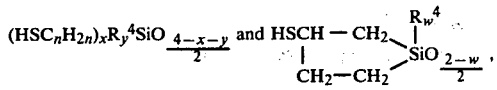

any other siloxane units present having the average unit formula

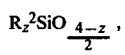

wherein
each $R^2$ is $R^4$ or a 3,3,3-trifluoropropyl radical,
each $R^4$ is $R^3$ or $OR^1$,
each $R^3$ is an alkyl radical of 1 to 4 inclusive carbon atoms or phenyl radical,
each $R^1$ is an alkyl radical of 1 to 4 inclusive carbon atoms,
n has a value of from 2 to 4 inclusive,
w has a value of from 0 to 1 inclusive,
x has a value of from 1 to 2 inclusive,
y has a value of from 0 to 2 inclusive,
z has a value of from 0 to 3 inclusive, and the sum of
x+y has a value of from 1 to 3 inclusive,
and the ratio of total $R^3$,

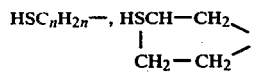

and 3,3,3-trifluoropropyl radicals to silicon atoms in the mercapto-functional organosiloxane is in the range of 0.98/1 to 3.00/1;

(B) 0 to 200 parts by weight of at least one filler;

(C) a catalytic amount of an iron carbonyl catalyst selected from the group consisting of $Fe(CO)_5$, $Fe_2(CO)_9$, $Fe_3(CO)_{12}$, dicyclopentadienyldiiron tetracarbonyl, butadieneiron tricarbonyl, and cyclohexadieneiron tricarbonyl; and (D) 0.1 to 6 parts by weight of an acid which meets the following criteria: (1) it must be compatible with the mixed composition, (2) it must be a proton donor and (3) the dissociation constant of the acid in an aqueous solution must be greater than $10^{-5}$.

This invention also relates to a method of forming a higher molecular weight product which consists essentially of the steps of (I) mixing 100 parts by weight of at least one mercapto-functional organosiloxane as defined in (A) above, a catalytic amount of an iron carbonyl catalyst as defined in (C) above and 0.1 to 6 parts by weight of an acid as defined in (D) above to form a mixture and (II) exposing said mixture to oxygen. This invention further relates to the product obtained by exposing the above composition or mixture to oxygen.

"Oxygen" is intended to mean gaseous oxygen which can be in the form of pure oxygen gas or atmospheric oxygen. Mercapto-functional organosiloxanes will also be referred to as mercaptoorganosiloxanes and includes disiloxanes, trisiloxanes and polysiloxanes consisting of siloxane units, some of which are mercapto-functional. Techniques for mixing compositions which are oxygen or moisture sensitive are well-known in the art. Bread dough mixers can be used for viscous mercaptoorganosiloxanes and low-shear mixers can be used for lower viscosity compositions.

This invention has two aspects. One is a novel method of polymerizing or curing mercapto-functional organosiloxanes to form higher molecular weight products. The other is directed toward the formation of storage-stable compositions. In order to accomplish the first aspect, one merely exposes a mixture of the mercapto-functional organosiloxane, a particular type of acid and an iron carbonyl catalyst to oxygen. Thus, if storage stability is not required, the mercapto-functional organosiloxane, acid and iron carbonyl catalyst can be mixed together, preferably in that order, in the presence of oxygen and immediately allowed to polymerize or cure.

When storage-stable compositions are desired, the ingredients are mixed in the substantial absence of oxygen by any well-known means. The preferred procedure is to mix the mercaptoorganosiloxanes, acid and filler, if any, under a dry nitrogen atmosphere. The mixture can then be subjected to a vacuum, such as 30 millimeters of mercury, for a short time to remove any trapped oxygen and water. The catalyst can then be added, preferably as a solution in a suitable solvent or diluent such as toluene, mineral oil or trimethylsiloxy endblocked polydimethylsiloxane fluid. Iron carbonyl compounds are generally known to be oxidized by exposure to oxygen, so the compounds should not be excessively exposed to the atmosphere during handling. It is therefore preferable that the mixed compositions be substantially free of exposure to oxygen during storage to maximize storage life. The presence of oxygen in catalyzed compositions can result in premature gelation. Therefore, the containers used to store the catalyzed compositions should be carefully selected to avoid materials which are sufficiently oxygen permeable to appreciably affect storage stability.

The substituents attached to silicon atoms can be $R^2$ which can be $R^4$ or 3,3,3-trifluoropropyl radicals. $R^4$ can be $R^3$ which can be alkyl radicals of 1 to 4 inclusive carbon atoms, such as methyl, ethyl, propyl, isopropyl and butyl, or phenyl radicals, or alkoxy radicals of a formula $OR^1$, where $R^1$ is an alkyl radical of 1 to 4 inclusive carbon atoms, such as methoxy, ethoxy, isopropoxy and butoxy. The mercapto-functional substituents present in the form of $HSC_nH_{2n}$, where n is 2 to 4, can be, for example, beta-mercaptoethyl, gamma-mercaptopropyl, 3-mercaptobutyl, and 3-mercapto,2-methylpropyl. Another mercapto-functional substituent can be 2-mercaptotetramethylene radical where both ends of the radical are attached to the same silicon atom.

The siloxane units containing no mercapto groups which have the average unit formula

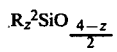

can be $SiO_2$ units, monosubstituted units such as monomethylsiloxane units, monoethylsiloxane units, monopropylsiloxane units, monobutylsiloxane units, or monophenylsiloxane units; disubstituted units such as dimethylsiloxane units, diethylsiloxane units, diphenylsiloxane units, phenylmethylsiloxane units, methylbutylsiloxane units, phenylethylsiloxane units, 3,3,3-trifluoropropylmethylsiloxane units, and methylisopropylsiloxane units; and trisubstituted units such as trimethylsiloxane units, phenyldimethylsiloxane units, triethylsiloxane units, diphenylmethylsiloxane units, diphenylisopropylsiloxane units, 3,3,3-trifluoropropyldimethylsiloxane units, diphenylbutylsiloxane units and triphenylsiloxane units.

The mercapto-functional siloxane units which have the average unit formula $(HSC_nH_{2n})_xR_y^4SiO_{\frac{4-x-y}{2}}$ or

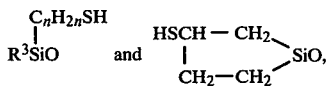

include the following

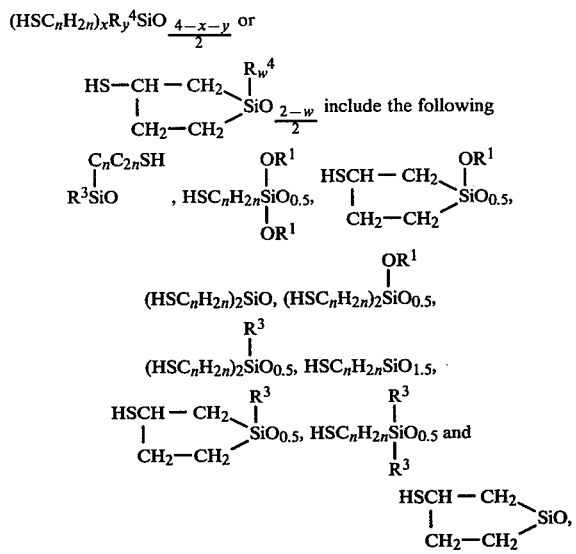

wherein $R^1$, $R^3$ and n are as defined above and n preferably has a value of 3. Mercaptoorganosiloxanes useful in the present invention contain an average of at least two mercapto-functional siloxane units per molecule.

The cured products of this invention can range in properties from soft gels to elastomers to hard resins. Physical properties such as durometer value and hardness are related to cross-link density. Cross-link density can be varied by several mechanisms. One mechanism is by adjusting the ratio of organic substituents (total alkyl, mercapto-functional, 3,3,3-trifluoropropyl, and phenyl substituents) bonded through Si—C bonds to silicon. Generally, the lower the ratio, the harder the cured product will be when all other variables, such as types of substituents and structure, are kept equal. In elastomeric products, higher durometer values generally indicate an increase in cross-link density. Another means for varying the cross-link density is to change the number of mercapto-functional siloxane units per molecule in the mercaptoorganosiloxane.

Compositions consisting only of mercaptoorganosiloxanes which contain an average of only two mercapto groups per molecule are generally only capable of chain-extension when exposed to oxygen and thus produce higher molecular weight gums which could find utility as encapsulants. Compositions containing an average of more than two mercapto groups per molecule are capable of polymerizing in the presence of oxygen to form three-dimensional networks which can range from soft gels where the average number of mercapto groups is close to two to hard resins where the mole percent of mercapto-functional siloxane units based on the total number of siloxane units in the mercaptoorganosiloxane approaches 100%.

The compositions of the present invention are especially useful in forming coatings which have a rapid rate of surface polymerization or cure upon exposure to air. Such a property is also useful in elastomeric sealant compositions to reduce the time that the surface can be contaminated with dust or other foreign material. Compositions with a wide variety of physical properties can be formulated by selecting the proper mercapto-functional polydiorganosiloxanes.

Pendant-functional mercaptopolydiorganosiloxanes useful in compositions of the present invention are mercaptopolydiorganosiloxanes containing $R_3^3SiO_{0.5}$ endblocking siloxane units and mercapto-functional siloxane units selected from the group consisting of

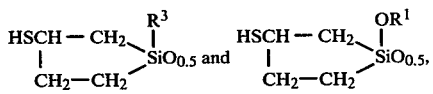

any remaining siloxane units being $R_2^3SiO$, wherein $R^3$ and n are defined above, the average number of mercapto-functional siloxane units per molecule is greater than 2 and the number average molecular weight of the pendant-functional mercaptopolydiorganosiloxane is less than 400,000. Compositions consisting solely of pendant-functional mercaptopolydiorganosiloxanes can result in products which range in properties from soft gels to elastomers to hard resins when exposed to oxygen.

When pendant-functional mercaptopolydiorganosiloxanes are used as the sole type of mercaptoorganosiloxane in formulations curable to elastomers, it is preferred that $R^3$ is methyl, n is 3, and the pendant-functional mercaptopolydiorganosiloxane has a number average molecular weight of less than 100,000 and contains a sufficient number of mercapto-functional siloxane units to result in a percentage of mercapto groups in the range of 0.14 to 2.5 percent based on the total weight of pendant-functional mercaptopolydiorganosiloxane.

Terminal-functional mercaptopolydiorganosiloxanes useful in elastomeric sealant, gel and gum formulations as chain-extending polymers are mercaptopolydiorganosiloxanes containing mercapto-functional siloxane units selected from the group consisting of $HSC_nH_{2n}(R^3)_2SiO_{0.5}$, $HSC_nH_{2n}(R^1O)_2SiO_{0.5}$, $$\begin{array}{cc} \text{HSCH}-\text{CH}_2\underset{\text{CH}_2-\text{CH}_2}{\overset{R^3}{\diagup}}\!\!\!\!\!\diagdown\!\!\text{SiO}_{0.5} \text{ and} & \text{HSCH}-\text{CH}_2\underset{\text{CH}_2-\text{CH}_2}{\overset{OR^1}{\diagup}}\!\!\!\!\!\diagdown\!\!\text{SiO}_{0.5}, \end{array}$$

any remaining siloxane units being $R_2^3SiO$, wherein $R^3$, $R^1$ and n are defined above and the number average molecular weight of the terminal-functional mercaptopolydiorganosiloxane is less than 400,000. Preferably, each $R^3$ is methyl, the mercapto-functional siloxane units are selected from the group consisting of $HSCH_2CH_2CH_2(CH_3)_2SiO_{0.5}$ and

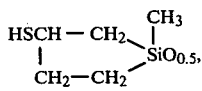

the number average molecular weight of the mercaptopolydiorganosiloxane is less than 100,000 and the weight percentage of mercapto groups present is in the range of 0.07 to 0.45 percent of the total weight of terminal-functional mercaptopolydiorganosiloxane. Polymerization of terminal-functional structures alone generally produces gums because only linear chain-extension is possible.

Another type of mercaptopolydiorganosiloxane useful in compositions of the present invention is a terminal-functional mercaptopolydiorganosiloxane which also contains pendant mercapto-functional siloxane units (hereinafter referred to as hybrid-functional mercaptopolydiorganosiloxanes). Such mercaptopolydiorganosiloxanes contain two terminal mercapto-functional siloxane units selected from the group consisting of $(HSC_nH_{2n})R_2^3SiO_{0.5}$, $(HSC_nH_{2n})(R^1O)_2SiO_{0.5}$,

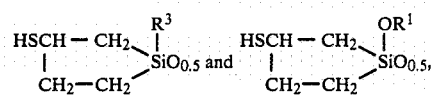

and at least one mercapto-functional siloxane unit selected from the group consisting of siloxane units of the formula $(HSC_nH_{2n})R^3SiO$ and

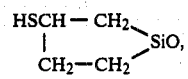

any remaining siloxane units being $R_2^3SiO$, wherein $R^3$, $R^1$ and n are defined above and the number average molecular weight of the hybrid-functional mercaptopolydiorganosiloxane is less than 400,000. Compositions consisting solely of hybrid-functional mercaptopolydiorganosiloxanes can result in products which range in properties from soft gels to elastomers to hard resins when exposed to oxygen.

Hybrid-functional mercaptopolydiorganosiloxanes are quite versatile and can be used as the sole type of mercaptopolydiorganosiloxane in formulations which cure to elastomers. In such formulations, it is preferred that each $R^3$ is methyl, n is 3, the terminal mercapto-functional siloxane units are selected from the group consisting of $(HSCH_2CH_2CH_2)(CH_3)_2SiO_{0.5}$ and

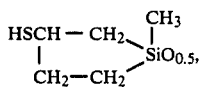

and the hybrid-functional mercaptopolydiorganosiloxane has a number average molecular weight of less than 100,000 and contains a sufficient number of mercapto-functional siloxane units to result in a weight percentage of mercapto groups in the range of 0.14 to 3 percent based on the total weight of hybrid-functional mercaptopolydiorganosiloxane. Hybrid-functional mercaptopolydiorganosiloxanes can be produced which cure to elastomeric products which range in properties from soft products with high elongation values to hard products which are not easily elongated by adjusting the molecular weight and/or the weight percent of mercapto groups in the mercaptopolydiorganosiloxane.

Blends of pendant- and terminal-functional mercaptopolydiorganosiloxanes can be used to obtain cured products which range in properties from soft gels to hard resins or from gums to hard rubbers. Likewise, the properties of hybrid-functional mercaptopolydiorganosiloxanes can also be altered by blending them with terminal-functional mercaptopolydiorganosiloxanes. To obtain blends which cure to elastomers, it is preferred that mercaptopolydiorganosiloxanes which are within the aforementioned preferred ranges for the mercaptopolydiorganosiloxanes be used. Thus, a blend of pendant- and terminal-functional mercapto-polydiorganosiloxanes would contain at least 0.14, but less than 2.5, weight percent of mercapto groups based upon the total weight of the mercaptopolydiorganosiloxanes in the blend while a blend of hybrid- and terminal-functional mercaptopolydiorganosiloxanes would contain at least 0.14, but less than 3, weight percent mercapto groups based upon the total weight of the mercaptopolydiorganosiloxanes in the blend.

The methods for preparing the above mercaptopolydiorganosiloxanes are well-known in the art. One method for making a type of pendant-functional mercaptopolydiorganosiloxane containing $HSC_nH_{2n}(R^3)SiO$ and $R_3^3SiO_{0.5}$ siloxane units is taught by Viventi in U.S. Pat. No. 3,346,405. Another method is taught in the Bokerman, et al, patent described previously. For example, Example 1 of the Bokerman, et al., patent teaches the production of a pendant-functional mercaptopolydiorganosiloxane which is a trimethylsiloxy-endblocked copolymer consisting of about 94 mole percent dimethylsiloxane units and about 5 mole percent 3-mercaptopropylmethylsiloxane units. Le Grow, in U.S. Pat. No. 3,655,713 teaches a procedure for making both pendant-functional and terminal-functional mercaptopolydiorganosiloxanes containing siloxane units possessing 2-mercaptotetramethylene substituents.

Several methods for producing terminal-functional mercaptodiorganosiloxanes containing $HSC_nH_{2n}R_2^3SiO_{0.5}$ siloxane units are known. One method involves the use of a disiloxane bearing a silicon-bonded mercaptoalkyl radical, such as symtetramethyl bis(3-mercaptopropyl)disiloxane, and a cyclic polydiorganosiloxane such as octamethylcyclotetrasiloxane. Appropriate amounts of the mercapto-functional disiloxane and cyclic polydiorganosiloxane are heated together with an acidic catalyst such as trifluoromethanesulfonic acid for 3 to 8 hours. The mixture is then neutralized and the mercapto-terminated polydiorganosiloxane is recovered. Hybrid-functional polymers can be prepared using the same type of compounds and techniques outlined above for producing terminal-functional mercaptopolydiorganosiloxanes by adding a cyclic mercaptopolydiorganosiloxane such as $\{HSCH_2CH_2CH_2(CH_3)SiO\}_4$ to the reaction mixture to introduce pendant-functional groups into the mercaptopolydiorganosiloxane. Likewise, the compounds and techniques used in preparing pendant-functional mercaptopolydiorganosiloxanes can be used to produce hybrid-functional types by substituting mercapto-functional endblocking units, which can be introduced in the form of a disiloxane such as sym-tetramethyl bis(3-mercaptopropyl)disiloxane, in place of non-functional endblocking units, such as those introduced in the form of hexamethyldisiloxane, in the reaction mixture.

Cyclic mercaptopolydiorganosiloxanes can be prepared by various methods, one of which involves preparing the corresponding chloroalkylsilane, such as 3-chloropropylmethyldichlorosilane, and hydrolyzing the silanes to form a mixture of linear and cyclic polydiorganosiloxanes. If desired, the ratio of cyclic to linear polydiorganosiloxanes can be altered by heating in the presence of an acidic catalyst for a period of time, during which time a portion of the cyclic polydiorganosiloxanes formed is being removed by distillation to shift the equilibrium of the reaction in the direction which favors the formation of cyclic polydiorganosiloxanes. Then, for example, Viventi teaches that the chloroalkyldiorganosiloxanes can be reacted with sodium sulfohydride to produce mercaptopolydiorganosiloxanes. Other means for preparing cyclic mercaptopolydiorganosiloxanes will be apparent to persons skilled in the art.

The production of a type of mercapto-functional organosiloxane resins by the partial hydrolysis of mixtures of silanes such as $HSC_nH_{2n}Si(OR^1)_3$ and $R_2{}^3Si(OR^1)_2$ is demonstrated by the Viventi patent. Likewise, mercapto-functional organosiloxane resins result when a sufficient number of siloxane units such as $R^3SiO_{1.5}$ are present in the mercaptoorganosiloxanes taught in the Le Grow patent. The Viventi, Le Grow and Bokerman, et al, patents are hereby incorporated by reference to teach the production of mercaptoorganosiloxanes useful in compositions of the present invention.

Mercaptopolydiorganosiloxanes which contain endblocking units of the formula

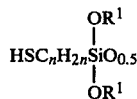

can be prepared by reacting a hydroxyl endblocked polydiorganosiloxane and a (mercaptoalkyl)trialkoxysilane of the formula

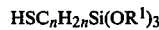

in the presence of solid potassium hydroxide or potassium silanolate catalysts. The potassium silanolate catalyst is preferred for higher viscosity polydiorganosiloxanes. The (mercaptoalkyl)trialkoxysilane is preferably used in an excess of about 10 mole percent over stoichiometric amounts. The resulting product is essentially a polydiorganosiloxane endblocked with units of the formula

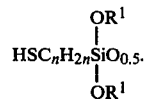

There may be some small amount of units wherein two SiOH groups have reacted with one (mercaptoalkyl)trialkoxysilane molecule, but these amounts are small enough that the character of the endblocked polydiorganosiloxane is not noticeably altered.

Compositions with various properties may be formulated using the above mercaptopolydiorganosiloxanes. Generally, use of only the pendant-functional mercaptopolydiorganosiloxanes results in elastomers with higher modulus values than formulations which additionally include terminal-functional mercaptopolydiorganosiloxanes. The latter give sealants with lower modulus values which are thus capable of much greater elongation before the cured composition tears. As a result, the sole use of pendant-functional mercaptopolydiorganosiloxanes results in cured sealants which are less readily elongated and are therefore primarily useful where there is only a small amount of movement in the joint to be sealed. Blends of the pendant- and terminal-functional mercaptopolydiorganosiloxanes are useful in building sealant formulations where a relatively large degree of joint movement occurs due to varying temperatures. It should be noted that not all the elastomeric sealant compositions of the present invention possess exceptionally good adhesion to common building substrates such as concrete or metal and can require the use of primers in certain applications.

Fillers may be used with the compositions of this invention, but are not required. Extending fillers can preferably be used in amounts of 10 to 200 parts by weight per 100 parts by weight of mercaptoorganosiloxane, especially in the elastomeric sealant formulations. Suitable extending fillers can be titanium dioxide, calcium carbonate, talc, clay, ground or crushed quartz, diatomaceous earth, fibrous fillers such as glass or asbestos and the like.

Reinforcing fillers such as fume silica, surface-treated fume silica, carbon black and the like may also be used. As is well-known in the art, reinforcing fillers cannot be used in as large an amount as extending fillers can be used, thus any formulation including such fillers would not contain more than 70 parts by weight of reinforcing fillers per 100 parts by weight of the mercaptoorganosiloxanes and preferably, from 5 to 30 parts. Extending fillers can also be included in formulations containing reinforcing fillers in amounts of up to 200 parts by weight per 100 parts by weight of the mercaptoorganosiloxanes less the amount of reinforcing filler present. Other additives such as coloring pigments, fire-retarding compounds and the like are also contemplated as being useful in the present invention. Routine testing can determine the effect of fillers and additives on shelf life.

Iron carbonyl compounds contemplated as being useful as catalysts in the practice of the present invention are $Fe(CO)_5$, $Fe_2(CO)_9$, $Fe_3(CO)_{12}$, dicyclopentadienyldiiron tetracarbonyl or $\{(C_5H_5)Fe(CO)_2\}_2$, butadieneiron tricarbonyl or $(C_4H_6)Fe(CO)_3$, and cyclohexadieneiron tricarbonyl or $(C_6H_8)Fe(CO)_3$. The amount of catalyst necessary is not critical. Any catalytic amount can be employed which will adequately polymerize or cure the compositions in the presence of oxygen to result in a product which is satisfactory for the desired end use. Changing the level of catalyst may alter the polymerization or cure rate and can alter the properties of the cured product, especially in the elastomeric products. I have found that a range of 0.1 to 6 parts by weight of iron carbonyl compound per 100 parts by weight of mercaptoorganosiloxanes is usually sufficient. The preferred iron carbonyl catalyst is iron pentacarbonyl.

As noted previously, the carbonyl compounds are affected by exposure to oxygen and thus their catalytic activity can be reduced during handling if steps are not taken to protect them from such exposure. Thus, to aid in the handling of the compounds and to further speed the incorporation of the catalyst into the composition, it is preferable to first dissolve the compounds in a hydrophobic solvent or diluent such as toluene, mineral oil or a trimethylsiloxy endblocked polydimethylsiloxane fluid. A 20 weight percent solution of iron pentacarbonyl ($Fe(CO)_5$) in a trimethylsiloxy endblocked polydimethylsiloxane fluid is preferred. Iron carbonyl compounds are well-known in the art and methods for their preparation may be found in the literature, for example, in Organometallic Compounds, Volume I, Dub, editor, Springer-Verlag, N.Y. (1966) and Handbook of Organometallic Compounds, Hagihara, Kumada and Okawara, editors, W. A. Benjamin Co., N.Y., pp. 822–903 (1968), which are both hereby incorporated by reference to teach the production of the above iron carbonyl compounds. Iron carbonyl compounds are known to be toxic and somewhat volatile, therefore care should be exercised when such compounds are handled and adequate ventilation should be provided during the polymerization or cure of these compositions.

To be useful as a surface-polymerization or surface-cure accelerator, an acid must meet three criteria: (1) it must be compatible with the mixed composition, (2) it must be a proton donor, and (3) the dissociation constant of the acid in aqueous solution must be greater than $10^{-5}$.

For purposes of the present application, the term "compatible" is intended to mean an acid which is sufficiently soluble in the mercaptoorganosiloxane composition to allow it to become homogeneously incorporated. For example, an acid which is not soluble in the mercaptoorganosiloxane composition generally cannot become homogeneously incorporated even when the acid is first dissolved in a solvent which is compatible with both the acid and the mercaptoorganosiloxanes present. The acid may initially appear to become homogeneously incorporated, but can later rise to the surface of a stored composition and will not have the desired accelerating effect on the rate of polymerization or cure. Furthermore, lack of solubility generally can result in a reduced or non-existent accelerating effect even if the acid does not immediately begin to separate from the composition.

The term "compatible" is also intended to mean that the acid is not sufficiently reactive with the composition during storage and/or after polymerization or cure to render the composition or cured product unsatisfactory for its intended use. For example, the presence of hydrochloric acid is known to catalyze depolymerization of polyorganosiloxanes. Such depolymerization can result in a deterioration in the properties of the cured product.

The term "proton donor" is intended to mean that an acid suitable for use in the present invention must be a proton donor in accordance with the generally accepted Lowry-Bronsted definition, i.e., an acid is a substance which gives up a proton and a base is a substance that accepts a proton. Thus, an acid which gives up a hydrogen ion upon dissociation, such as acetic or sulfuric acid, is a proton donor under this definition and meets the second criterion. Not all Lewis acids, which are defined as electron-pair acceptors and include compounds such as boron trifluoride, meet the requirements of the second criterion.

The tendency of an acid to give up a proton is referred to as acid strength and a commonly accepted measure of acid strength is the acidic dissociation constant (usually symbolized by K, $K_A$ or $K_a$) of the acid in an aqueous solution. Such constants have been extensively studied and are readily available in the literature. Polybasic acids which are capable of donating more than one proton per molecule have a separate dissociation constant listed for each proton and for purposes of the present invention, only the dissociation constant of the first proton is used in determining whether the acid meets the third criterion. Acid strength increases as the value of the dissociation constant increases and acids with values of K (for the first proton to dissociate) greater than $10^{-5}$ are required for use in the present invention. For example, the dissociation constant for acetic acid is $K=1.76\times10^{-5}$, as reported in a table in the Handbook of Chemistry and Physics, 50th Edition, Weast, editor, The Chemical Rubber Co., Cleveland, OH, p. D-118f. (1969), which table is hereby incorporated by reference to teach various acids which can be used in compositions of the present invention. Since the dissociation constant for acetic acid is greater than $10^{-5}$, acetic acid would satisfy the third criterion.

Both monobasic and polybasic organic and inorganic acids can be used as accelerators if the above three criteria are met. Preferably, carboxylic acids such as acetic, hexanoic, 2-ethylhexanoic and octanoic acid can be used. I have discovered that 2-ethylhexanoic acid is a preferred acid because it is a liquid which is easily incorporated and is much less volatile than acids such as acetic. A unique type of acid accelerator would be carboxylic acids which additionally contain mercapto groups, preferably, those containing two or more mercapto groups, such as $(HSCH_2)_2CHCO_2H$ or 2,3-dimercaptosuccinic acid, which would become a part of the polymer structure upon curing. Acids which are solids at room temperature may be added as solutions in solvents which are compatible with both the acids and the mercaptoorganosiloxanes. Such acid accelerators are useful in the present invention when added in amounts in the range of 0.1 to 6 parts by weight of acid per 100 parts by weight of mercaptoorganosiloxane in the formulation.

Acids satisfying the second and third criteria are easily discovered by reference to tables in the literature and such tables can serve as a guide for selecting acids useful as accelerators. The compatibility of a selected acid with the formulation is a very important criterion and can readily be determined by one skilled in the art through routine testing. For example, storage stability testing can be used to indicate solubility problems with will be evidenced by a loss or absence of accelerated surface cure rate when compared to formulations which do not contain an acid accelerator. Thus, formulations used to coat electrical wires which generate heat during use can be cured and subjected to accelerated heat stability tests to determine if the presence of the acid chosen significantly affects the properties of the cured coatings. If the acid causes an unacceptable amount of deterioration in properties when compared to a formulation containing another type of acid or a formulation without acid accelerator, that acid is not compatible for purposes of the present invention and fails to meet the first criterion. However, the same acid may be compatible when used in a formulation with a different end-use such as in a paper coating.

It is believed that compositions of the present invention polymerize or cure by the formation of disulfide (—SS—) bonds upon exposure to oxygen due to the action of the iron carbonyl catalyst which is further accelerated at the surface by acids meeting the above three criteria. Once the surface has polymerized or cured, the compositions appear to polymerize or cure at approximately the same rate as compositions which do not contain acid accelerators. Heating will accelerate the rate of cure in the manner that most chemical reactions are accelerated by a rise in temperature.

Compositions of the present invention are especially useful where compositions are to be cured to thin films such as in electrical insulation and paper coatings. The polymerization or cure reaction only requires the presence of oxygen which is readily available from the atmosphere. Other applications and advantages of the compositions of the present invention will be readily apparent to those skilled in the art.

The following examples are intended as being merely illustrative and are not to be construed as limiting the scope of the present invention, which is properly defined by the appended claims. Unless otherwise indicated, all parts and percentages in the following examples are by weight.

EXAMPLE 1

The accelerated surface cure rate obtained with the acid-containing compositions of the present invention is demonstrated by this comparative example. A pendant-functional mercaptopolydiorganosiloxane was prepared which was a trimethylsiloxy-endblocked copolymer consisting of dimethylsiloxane and 3-mercaptopropylmethylsiloxane units, there being about 5 mole percent of 3-mercaptopropylmethylsiloxane units present based upon the total moles of siloxane units present in the polymer. Different batches of the mercaptopolydiorganosiloxane were used, but it is believed that the cure rates of the two batches are comparable. The mercaptopolydiorganosiloxane batch (hereinafter referred to as Batch A) used in the sample containing acid container 1.98 weight percent mercapto groups and had a viscosity of 1.5 pascal-seconds (Pa·s) at 25° C. while the batch used in the sample without acid accelerator (hereinafter referred to as Batch B) contained 2.25 weight percent mercapto groups. The weight percent of mercapto groups was obtained by the iodine titration test outlined in Critchfield, Organic Functional Group Analysis, MacMillan Co., NY, p. 166 (1963).

Two base compositions were prepared, one consisting of 50 grams of Batch A plus 0.3 grams of 2-ethylhexanoic acid and the other consisting of 50 grams of Batch B only. The bases were placed in low-density polyethylene SemKit® tubes (commercially available from Semco, Inc., division of Products Research and Chemical Corp., Glendale, Cal.) which are cylinders having the appearance of tubes commonly used for caulking compounds, contain a means for stirring the contents and are designed to be placed in a vacuum to remove volatile materials from compositions placed inside the tube. The bases were then de-aired by subjecting them to a vacuum of 30 millimeters of mercury for 15 minutes. A seal was then placed on the back of the tubes. One gram of a 20% by weight solution of iron pentacarbonyl (Fe(CO)$_5$) in a trimethylsiloxy endblocked polydimethylsiloxane fluid with a viscosity of 0.05 Pa·s at 25° C. (hereinafter referred to as catalyst solution) was injected into each sealed SemKit® tube and the stirrer was used to evenly incorporate the catalyst solution into the base.

The samples were exposed to air at room temperature (22° C.) and the time for surface gelation to occur (skin-over time) and the time for the surface to become tack-free to touch with a piece of polyethylene (tack-free time) was recorded for each sample. The sample without acid was not prepared and evaluated on the same day as the acid-containing sample and is included only for comparative purposes. The sample containing no acid accelerator had a skin-over time of 12 minutes and became tack-free in 26 minutes. The sample containing acid was tack-free and had cured to a thickness of approximately 0.15 millimeters (mm) after 110 seconds exposure to air. Both samples had cured to a thickness of approximately 3.2 mm after 24 hours.

After one week of room temperature storage in the sealed SemKit® tube, the acid accelerated composition was substantially unchanged and had the same rate of cure as it did initially.

EXAMPLE 2

In this example, the effect of various amounts of acid and iron carbonyl catalyst on tack-free time was investigated. The compositions listed in Table I were prepared and cured using the procedure outlined in Example 1. The tack-free times reported in Table I indicate that faster surface cure rates can be obtained by increasing the level of acid, iron carbonyl catalyst or both.

TABLE I

| Sample | Batch A* (Grams) | 2-Ethylhexanoic Acid (Grams) | Catalyst Solution* (Grams) | Tack-free Time (Seconds) |
|---|---|---|---|---|
| A | 50 | 0.3 | 1.0 | 110 |
| B | 50 | 1.0 | 1.0 | 65 |
| C | 50 | 1.0 | 2.0 | 45 |
| D | 50 | 2.0 | 2.0 | 30 |

*Identical to that used in Example 1.

That which is claimed is:

1. A composition of matter, stable in the absence of oxygen, consisting essentially of a product obtained by mixing the following substantially in the absence of oxygen (A) 100 parts by weight of at least one mercapto-functional organosiloxane, said mercapto-functional organosiloxane having an average of at least two mercapto-functional siloxane units per molecule selected from the group consisting of mercapto-functional siloxane units of the average unit formula

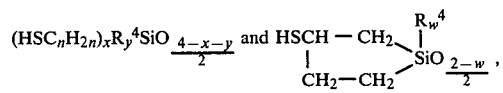

any other siloxane units present having the average unit formula

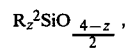

wherein
each $R^2$ is $R^4$ or a 3,3,3-trifluoropropyl radical,
each $R^4$ is $R^3$ or $OR^1$,
each $R^3$ is an alkyl radical of 1 to 4 inclusive carbon atoms or phenyl radical,
each $R^1$ is an alkyl radical of 1 to 4 inclusive carbon atoms,
n has a value of from 2 to 4 inclusive,
w has a value of from 0 to 1 inclusive,
x has a value of from 1 to 2 inclusive,
y has a value of from 0 to 2 inclusive,
z has a value of from 0 to 3 inclusive, and the sum of x+y has a value of from 1 to 3 inclusive,
and the ratio of total $R^3$, $HSC_nH_{2n}-$,

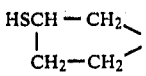

and 3,3,3-trifluoropropyl radicals to silicon atoms in the mercapto-functional organosiloxane is in the range of 0.981/1 to 3.00/1;
(B) 0 to 200 parts by weight of at least one filler;
(C) a catalytic amount of an iron carbonyl catalyst selected from the group consisting of $Fe(CO)_5$, $Fe_2(CO)_9$, $Fe_3(CO)_{12}$, dicyclopentadienyldiiron tetracarbonyl, butadieneiron tricarbonyl, and cyclohexadieneiron tricarbonyl; and
(D) 0.1 to 6 parts by weight of an acid which meets the following criteria: (1) it must be compatible with the mixed composition, (2) it must be a proton donor and (3) the dissociation constant of the acid in an aqueous solution must be greater than $10^{-5}$.

2. The composition as claimed in claim 1 wherein the catalytic amount of (C) is in a range of 0.1 to 6 parts by weight of iron carbonyl catalyst per 100 parts by weight of the mercapto-functional organosiloxane.

3. The composition as claimed in claim 2 wherein the iron carbonyl catalyst is $Fe(CO)_5$.

4. The composition as claimed in claim 3 wherein the acid is 2-ethylhexanoic acid.

5. The composition as claimed in claims 3 or 4 wherein the mercapto-functional organosiloxane is at least one pendant-functional mercaptopolydiorganosiloxane containing $R^3_3SiO_{0.5}$ endblocking siloxane units and mercapto-functional siloxane units selected from the group consisting of

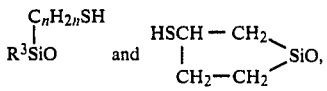

any remaining siloxane units being $R^3_2SiO$, wherein the average number of mercapto-functional siloxane units per molecule is greater than 2 and the number average molecular weight of the pendant-functional mercaptopolydiorganosiloxane is less than 400,000.

6. The composition as claimed in claim 5 wherein $R^3$ is methyl, n is 3, and the pendant-functional mercaptopolydiorganosiloxane has a number average molecular weight of less than 100,000 and contains a sufficient number of mercapto-functional siloxane units to result in a weight percentage of mercapto groups in the range of 0.14 to 2.5 percent based on the total weight of pendant-functional mercaptopolydiorganosiloxane.

7. The composition as claimed in claims 3 or 4 wherein the mercapto-functional organosiloxane is at least one hybrid-functional mercaptopolydiorganosiloxane containing two terminal mercapto-functional siloxane units selected from the group consisting of $(HSC_nH_{2n})R^3_2SiO_{0.5}$, $(HSC_nH_{2n})(R^1O)_2SiO_{0.5}$,

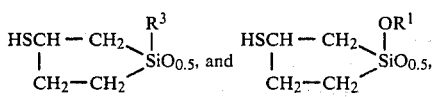

and at least one mercapto-functional siloxane unit selected from the group consisting of $(HSC_nH_{2n})R^3SiO$ and

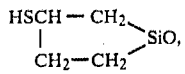

any remaining units being $R^3_2SiO$, wherein the number average molecular weight of the hybrid-functional mercaptopolydiorganosiloxane is less than 400,000.

8. The composition as claimed in claims 3 or 4 wherein the mercapto-functional organosiloxane is at least one hybrid-functional mercaptopolydiorganosiloxane containing two mercapto-functional siloxane units selected from the group consisting of $(HSCH_2CH_2CH_2)(CH_3)_2SiO_{0.5}$ and

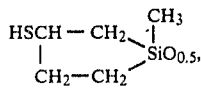

and at least one mercapto-functional siloxane unit selected from the group consisting of $(HSCH_2CH_2CH_2)(CH_3)SiO$ and

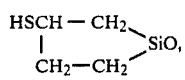

any remaining siloxane units being $(CH_3)_2SiO$, wherein the hybrid-functional mercaptopolydiorganosiloxane has a number average molecular weight of less than 100,000 and contains a sufficient number of mercapto-functional siloxane units to result in a weight percentage of mercapto groups in the range of 0.14 to 3 percent based on the total weight of hybrid-functional mercaptopolydiorganosiloxane.

9. The composition as claimed in claim 5 having admixed therewith at least one terminal-functional mercaptopolydiorganosiloxane containing mercapto-functional siloxane units selected from the group consisting of $HSC_nH_{2n}(R^3)_2SiO_{0.5}$, $HSC_nH_{2n}(R^1O)_2SiO_{0.5}$,

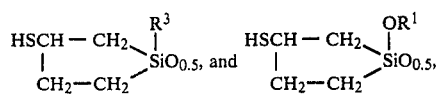

any remaining siloxane units being $R^3_2SiO$, wherein the number average molecular weight of the terminal-functional mercaptopolydiorganosiloxane is less than 400,000.

10. The composition as claimed in claim 6 having admixed therewith at least one terminal-functional mercaptopolydiorganosiloxane containing mercapto-functional siloxane units selected from the group consisting of $(HSCH_2CH_2CH_2)(CH_3)_2SiO_{0.5}$ and

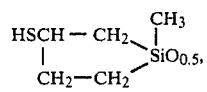

any remaining siloxane units being $(CH_3)_2SiO$, wherein said terminal-functional mercaptopolydiorganosiloxane has a number average molecular weight of less than 100,000 and contains a sufficient number of mercapto-functional siloxane units to result in a weight percentage of mercapto groups in the range of 0.07 to 0.45 percent based on the total weight of terminal-functional mercaptopolydiorganosiloxane and the total weight percent of mercapto groups in the admixed mercaptopolydiorganosiloxanes is in the range of 0.14 to less than 2.5 percent of the total weight of the admixed mercaptopolydiorganosiloxanes.

11. The composition as claimed in claim 7 having admixed therewith at least one terminal-functional mercaptopolydiorganosiloxane containing mercapto-functional siloxane units selected from the group consisting of $HSC_nH_{2n}(R^3)_2SiO_{0.5}$, $HSC_nH_{2n}(R^1O)_2SiO_{0.5}$,

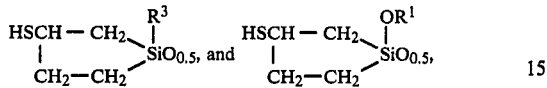

any remaining siloxane units being $R_2{}^3SiO$, wherein the number average molecular weight of the terminal-functional mercaptopolydiorganosiloxane is less than 400,000.

12. The composition as claimed in claim 8 having admixed therewith at least one terminal-functional mercaptopolydiorganosiloxane containing mercapto-functional siloxane units selected from the group consisting of $(HSCH_2CH_2CH_2)(CH_3)_2SiO_{0.5}$ and

any remaining siloxane units being $(CH_3)_2SiO$, wherein said terminal-functional mercaptopolydiorganosiloxane has a number average molecular weight of less than 100,000 and contains a sufficient number of mercapto-functional siloxane units to result in a weight percentage of mercapto groups in the range of 0.07 to 0.45 percent based on the total weight of terminal-functional mercaptopolydiorganosiloxane and the total weight percent of mercapto groups in the admixed mercaptopolydiorganosiloxanes is in the range of 0.14 to less than 3 percent of the total weight of the admixed mercaptopolydiorganosiloxanes.

13. A composition which consists essentially of a product formed upon exposure of the composition of claim 3 to oxygen.

14. A composition which consists essentially of a product formed upon exposure of the composition of claim 4 to oxygen.

15. A cured composition which consists essentially of an elastomer formed upon exposure of the composition of claim 6 to oxygen.

16. A cured composition which consists essentially of an elastomer formed upon exposure of the composition of claim 8 to oxygen.

17. A cured composition which consists essentially of an elastomer formed upon exposure of the composition of claim 10 to oxygen.

18. A cured composition which consists essentially of an elastomer formed upon exposure of the composition of claim 12 to oxygen.

19. A method of forming a higher molecular weight product which consists essentially of the steps of
(I) mixing
(a) 100 parts by weight of at least one mercapto-functional organosiloxane, said mercapto-functional organosiloxane having an average of at least two mercapto-functional siloxane units per molecule selected from the group consisting of mercapto-functional siloxane units of the average unit formula

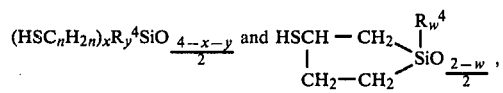

any other siloxane units present having the average unit formula

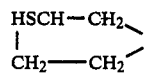

wherein
each $R^2$ is $R^4$ or a 3,3,3-trifluoropropyl radical,
each $R^4$ is $R^3$ or $OR^1$,
each $R^3$ is an alkyl radical of 1 to 4 inclusive carbon atoms or phenyl radical,
each $R^1$ is an alkyl radical of 1 to 4 inclusive carbon atoms,
n has a value of from 2 to 4 inclusive,
w has a value of from 0 to 1 inclusive,
x has a value of from 1 to 2 inclusive,
y has a value of from 0 to 2 inclusive,
z has a value of from 0 to 3 inclusive, and the sum of x+y has a value of from 1 to 3 inclusive,
and the ratio of total $R^3$, $HSC_nH_{2n}$,

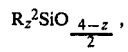

and 3,3,3-trifluoropropyl radicals to silicon atoms in the mercapto-functional organosiloxane is in the range of 0.98/1 to 3.00/1;
(b) a catalytic amount of an iron carbonyl catalyst selected from the group consisting of $Fe(CO)_5$, $Fe_2(CO)_9$, $Fe_3(CO)_{12}$, dicyclopentadienyldiiron tetracarbonyl, butadieneiron tricarbonyl, and cyclohexadieneiron tricarbonyl; and
(c) 0.1 to 6 parts by weight of an acid which meets the following criteria: (1) it must be compatible with the mixed composition, (2) it must be a proton donor and (3) the dissociation constant of the acid in an aqueous solution must be greater than $10^{-5}$, to form a mixture and
(II) exposing said mixture to oxygen.

20. The method as claimed in claim 19 wherein the amount of iron carbonyl catalyst present is in a range of 0.1 to 6 parts by weight per 100 parts by weight of (I)(a) and the iron carbonyl catalyst is $Fe(CO)_5$.

21. The method as claimed in claim 19 wherein the mixture of (I) additionally contains up to 200 parts by weight at least one filler per 100 parts by weight of (I)(a).

22. A composition which consists essentially of the higher molecular weight product obtained in accordance with the method of claim 19.

23. A composition which consists essentially of the higher molecular weight product obtained in accordance with the method of claim 20.

24. A composition which consists essentially of the higher molecular weight product obtained in accordance with the method of claim 21.

25. The composition as claimed in claims 1, 2, 3, or 4 which contains at least one filler.

26. The composition as claimed in claims 13 or 14 which contains at least one filler.

* * * * *

UNITED STATES PATENT AND TRADEMARK OFFICE
CERTIFICATE OF CORRECTION

PATENT NO. : 4,269,741

DATED : May 26, 1981

INVENTOR(S) : Gary R. Homan

It is certified that error appears in the above—identified patent and that said Letters Patent is hereby corrected as shown below:

In column 2, line 15, the word "pending" should be deleted.

In column 3, line 46, the formula "$Fe_2(CO)_9$" should read --$Fe_2(CO)_9$--.

In column 5, line 18, the formula "$\underset{R^3SiO}{C_nC_{2n}SH}$" should read --$\underset{R^3SiO}{C_nH_{2n}SH}$--.

In column 13, line 30, the word "container" should read --contained--.

In column 15, line 8, the ratio "0.981/1" should read --0.98/1--.

Signed and Sealed this

Twentieth Day of April 1982

[SEAL]

Attest:

GERALD J. MOSSINGHOFF

Attesting Officer     Commissioner of Patents and Trademarks